US008498467B2

(12) United States Patent
Joly et al.

(10) Patent No.: US 8,498,467 B2
(45) Date of Patent: Jul. 30, 2013

(54) METHOD FOR PROCESSING A THREE-DIMENSIONAL IMAGE OF THE SURFACE OF A TIRE SO THAT IT CAN BE USED TO INSPECT THE SAID SURFACE

(75) Inventors: Alexandre Joly, Cournon d'Auvergne (FR); Christian Leobal, Veyre-Monton (FR); Claire Moreau, Gerzat (FR); François Gaspard, Les Ulis (FR); Régis Vinciguerra, Villiers sur Orge (FR); Steve Bourgeois, Choisy le Roy (FR)

(73) Assignees: Compagnie Generale des Etablissements Michelin, Clermont-Ferrand (FR); Michelin Recherche et Technique S.A., Granges-Paccot (CH)

( * ) Notice: Subject to any disclaimer, the term of this patent is extended or adjusted under 35 U.S.C. 154(b) by 420 days.

(21) Appl. No.: 12/809,597

(22) PCT Filed: Dec. 16, 2008

(86) PCT No.: PCT/EP2008/067654
§ 371 (c)(1),
(2), (4) Date: Sep. 20, 2010

(87) PCT Pub. No.: WO2009/077539
PCT Pub. Date: Jun. 25, 2009

(65) Prior Publication Data
US 2011/0019903 A1    Jan. 27, 2011

(30) Foreign Application Priority Data

Dec. 19, 2007    (FR) .................................... 07 60042

(51) Int. Cl.
*G06K 9/00*         (2006.01)
(52) U.S. Cl.
USPC ......................................... 382/141; 382/154

(58) Field of Classification Search
USPC ................. 382/112, 141, 151, 154, 201, 209, 382/218, 276, 294; 348/86, 92
See application file for complete search history.

(56) References Cited

U.S. PATENT DOCUMENTS

| 5,715,166 | A   |   | 2/1998 | Besl et al. |             |
|-----------|-----|---|--------|-------------|-------------|
| 7,343,789 | B2  | * | 3/2008 | Fujisawa et al. | ................ 73/146 |
| 7,997,129 | B2  | * | 8/2011 | Sukegawa et al. | ........... 73/146.5 |

FOREIGN PATENT DOCUMENTS

| EP | 1 477 765 | 11/2004 |
| EP | 1 750 089 | 2/2007 |

OTHER PUBLICATIONS

Y. Li et al., "Free-form surface inspection techniques state of the art review", Computer Aided Design, Elsevier Publishers, vol. 36, No. 13, pp. 1395-1417, Nov. 1, 2004.
G. Wolberg et al., "Robust image registration using log-polar transform", Image Processing, Proceedings 2000 International Conference on Sep. 10-13, 2000, Piscataway, N.J., USA, vol. 1, pp. 493-496, Sep. 10, 2000.

* cited by examiner

*Primary Examiner* — Daniel Mariam
(74) *Attorney, Agent, or Firm* — Cozen O'Connor

(57) ABSTRACT

Method for inspecting a zone of the surface of a tire, said surface comprising markings in relief, wherein the three-dimensional profile of the surface to be inspected is determined, characteristic points on the surface to be inspected are located and these points are matched with the corresponding points originating from the three-dimensional data of a reference surface, so as to create a set of pairs of matched points, in an iterative manner, a first affine transformation function is sought, applied to the characteristic points of the reference surface, so that the value representing the sum of the distances between each of the characteristic points of the reference surface, which points are transformed with the aid of said first transformation function, and the points of the surface to be inspected that are matched with them, is minimal, and said first transformation function is applied to all of the points of the reference surface in order to obtain a transformed reference surface.

13 Claims, 6 Drawing Sheets

Fig 3
Fig 4
Fig 5
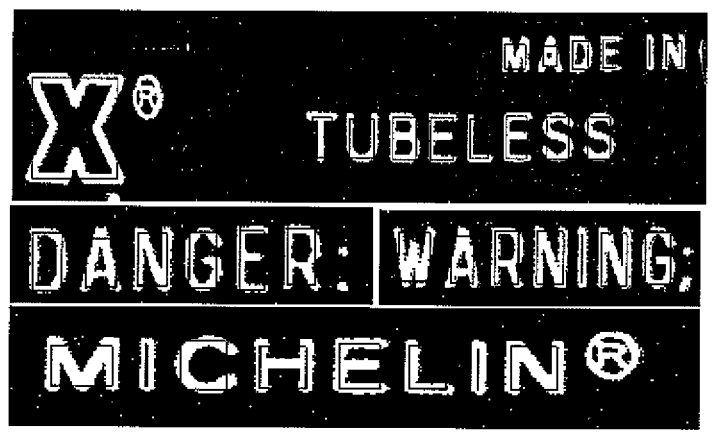
Fig 6
Fig 7

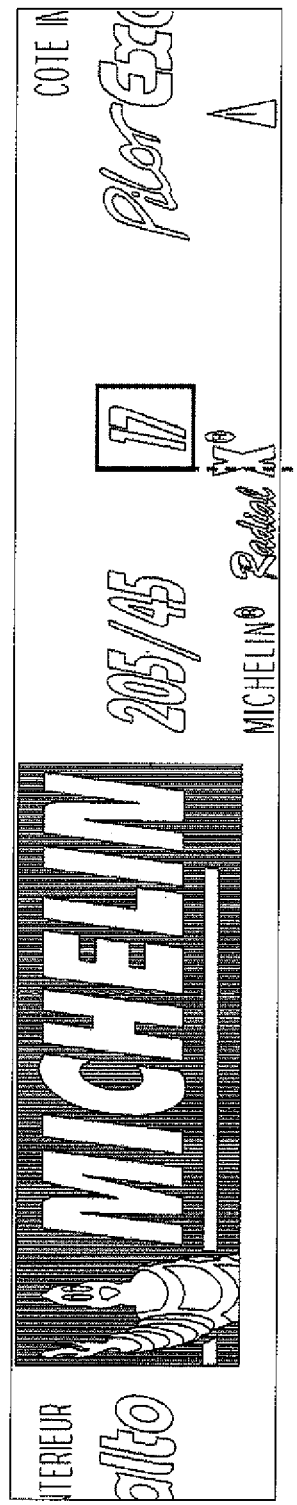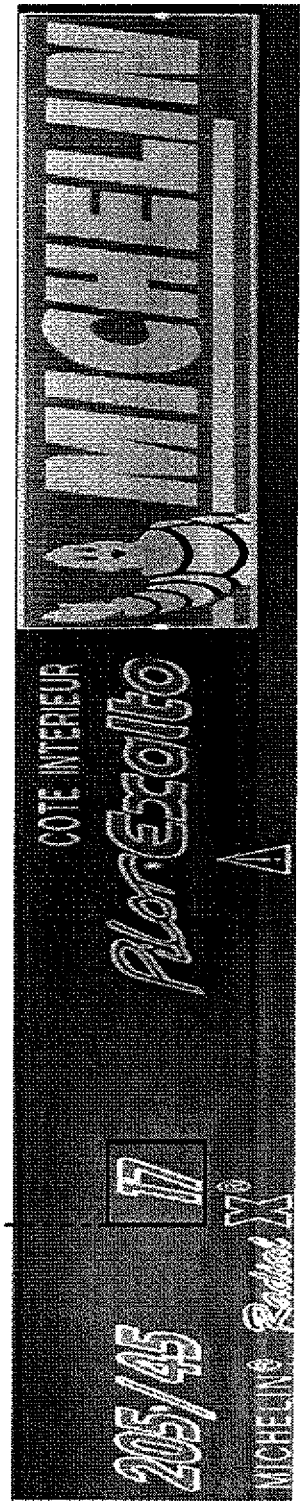
Fig 8
Fig 9

METHOD FOR PROCESSING A THREE-DIMENSIONAL IMAGE OF THE SURFACE OF A TIRE SO THAT IT CAN BE USED TO INSPECT THE SAID SURFACE

RELATED APPLICATIONS

This is a U.S. national stage under 35 USC §371 of application No. PCT/EP2008/067654, filed on Dec. 16, 2008.

This application claims the priority of French application Ser. No. 07/60042 filed Dec. 19, 2007, the entire content of which is hereby incorporated by reference.

FIELD OF THE INVENTION

The invention relates to the field of tire manufacture. More particularly, the present invention relates to the problem of visual inspection of the tires during or at the end of the production process, for the purpose of determining the conformity thereof with the inspection references established for the purpose of the use that will be made of said tire.

BACKGROUND OF THE INVENTION

The increase, at constant cost, of computing power now allows the development on an industrial scale of automatic inspection means designed to assist the operators responsible for visually inspecting the tires. These means largely make use of image-processing techniques the performance of which, in terms of speed of analysis and of definition, depends largely on the computing power used.

The methods employed to carry out these processes usually consist in comparing an image in two or preferably three dimensions of the surface of the tire to be inspected with a reference image in two and preferably three dimensions of the surface of said tire. Accordingly, an effort is made to match the image or the surface of the tire to be inspected and the image or the reference surface, for example by superposing them, and the manufacturing anomalies are determined by analysing the differences between the two images or the two surfaces.

A method of this type is described as an example in publication U.S. Pat. No. 5,715,166 which describes the transformations to be carried out in order to match a reference surface with a three-dimensional image of a given object by using transformation functions such as rotational or sliding movements. This method is applied with good results when the aim is to match non-deformable solid objects such as metal parts considered in this instance to be infinitely rigid.

In the case of the tire, the reference image of the surface may be obtained from digital data originating from the design of the tire or, more commonly, from the digital data used to describe and to manufacture the curing mould, said mould itself being intended to give its definitive shape to said tire.

The three-dimensional image of the surface of the tire may be obtained, in a known manner, with the aid of a camera capable of determining the three-dimensional relief of the surface of the tire.

However, it is observed that the tire taken out of the mould does not correspond exactly with the negative image of the mould in which the moulding and curing operation took place, because of the elastic nature of the materials that it is made of.

Specifically, the tire deforms as soon as it comes out of the curing press because of the thermal retractions of the materials when they cool. Moreover, during mounting and inflation, the reinforcing plies take their final position and the equilibrium curve of the inflated tire does not necessarily correspond to the shape of the tire given by the curing mould.

It is therefore necessary to first adjust the image of the reference surface and of the acquired image of the surface of the tire to be inspected, in order to match the two surfaces for the purpose of drawing pertinent information on the conformity of the tire originating from manufacture.

One method of this type is described, as an example, in publication EP 1 750 089. According to this publication, the three-dimensional representation of the surface of the tire to be inspected and the three-dimensional representation of the reference corresponding thereto, are divided into surface portions of reduced dimensions, corresponding substantially to the surface of a marking element such as a letter or a set of letters. Still according to the method in question, the computing algorithms are adapted in order to slide the surface portions, of the reference surface and of the surface to be inspected, one over the other in order to determine the optimum match between the contours of the reliefs of the two surfaces. Once this local adjustment has been carried out, and for the surface portion in question, the two surface portions are compared with one another in order to determine the degree of conformity of the tire to be inspected with a reference.

Although the algorithms described in this publication have the advantage of dispensing, in a large measure, with the position differences between the model and the real tire described above, and the mounting and inflation differences from one casing to another, they are close to those described in publication U.S. Pat. No. 5,715,166 in that they assimilate the surface portions to rigid elements.

Nevertheless a lack of robustness is observed in the application of this method, in particular, when the surface of the tire to be inspected has considerable anomalies such as a total absence of a marking element, or the presence of a foreign element in the marking in relief, which anomalies have the effect of disrupting the algorithm for matching the acquired image and the reference image in this surface portion. Moreover, this method gives poor results in smooth surfaces that do not have any marking and that may also comprise moulding anomalies.

SUMMARY OF THE INVENTION

An object of the invention is to provide a solution to these problems.

The object of the invention is to provide a solution to these problems.

The inspection method according to the invention relates to the surface portions of a tire comprising markings in relief. "Markings in relief" means elements such as figures or alphanumeric characters, sequences of characters forming words or numbers, figurative characters such as ideograms, decorative patterns or drawings, striations, and situated on the sidewall or on the inner surface, or else sculpture patterns of the tread.

One aspect of the invention is directed to an inspection method that comprises the steps of:

the three-dimensional profile of the surface to be inspected is determined, characteristic points of the surface to be inspected are located and these points are matched with the corresponding characteristic points originating from the three-dimensional data of a reference surface, so as to create a set of pairs of matched characteristic points, in an iterative manner, a first transformation function is sought, applied to the characteristic points of the reference surface, so that the value representing the sum of the distances between each of the characteristic points of the reference surface, transformed with the aid of said first transformation function, and the points of the surface to be inspected that are matched with them, is minimal, said first transformation function is applied to all of the points of the reference surface in order to obtain a transformed reference surface.

This method is characterized in that said transformation function is an affine function comprising a homothetic transformation the ratio of which has an absolute value that is different from 1.

In this manner, it is possible to transform the reference surface by deforming it so as to adjust all of the points of the reference surface relative to the surface to be inspected in order to dispense with the overall variations of shape between the reference surface and the surface to be inspected. This affine transformation is distinct from the transformations in which the homothetic transformations have a ratio equal to 1 and which are then reduced to simple rotations or translations.

All the points of the reference surface are taken into account and transformed by said first transformation function, which makes it possible to match the surfaces comprising markings in relief in the same manner as surfaces that are smooth or comprise no marking because of an anomaly.

An embodiment of the invention also makes provision to determine second transformation functions of the affine transformation type comprising a homothetic transformation with a ratio different from 1, on surface portions so as to refine the initial adjustment of the reference surface.

As will be seen below, the quality of these adjustments depends largely on the determination of the characteristic points, but also on the field of application of the transformation function. Specifically, it is necessary to dispense with the influence of the local deformations usually caused by production anomalies that it is sought to detect. This distortion is avoided by applying said first or said second transformations to surfaces considered to be homogeneous, that is to say sustaining substantially the same level of elastic transformation.

Calculation time is also a determinant limiting factor. Therefore, the application of the invention is made easier by the prior execution of complementary simplification steps that are aimed at shortening this calculation time, without adversely affecting the quality of the result sought.

BRIEF DESCRIPTION OF THE DRAWINGS

FIGS. 3, 4, 5 illustrate the skeletonization of the alphanumeric characters, FIGS. 6 and 7 illustrate possible choices of characteristic points, FIGS. 8 and 9 illustrate the step of adjusting the azimuths.

DETAILED DESCRIPTION OF THE DRAWINGS

Figure 1:
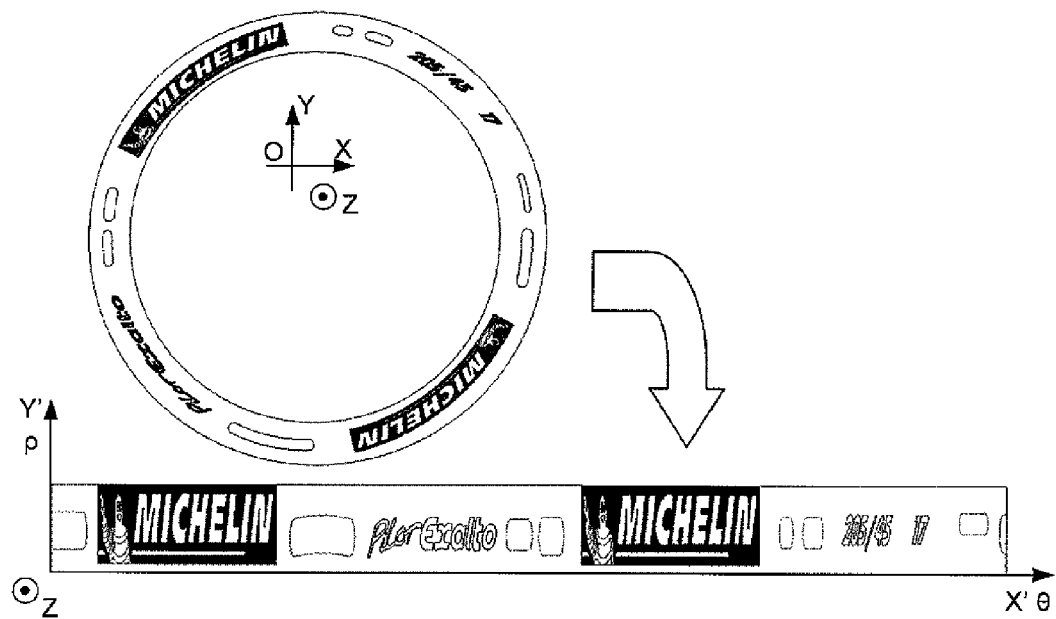
FIG. 1 represents a 2D image of the contours of the elements in relief of a reference surface and of the unrolled image of said image.

The first step of the method obtains, in a known manner, the data making it possible to characterize the three-dimensional surface of the surface to be inspected. In order to carry out this operation, the surface is illuminated with the aid of a white light or of a light with a given wavelength, such as the light originating from a laser beam, and the light reflected by the surface is captured with the aid of a matrix array camera the columns of which are analysed. It is also possible to use a three-dimensional sensor with laser triangulation the principles of which can be assimilated, in two dimensions, to those of a linear array camera.

The tire to be inspected is installed on a means making it possible to set it in rotation relative to the camera. By making the tire carry out a complete rotation about its axis of rotation relative to the camera, the digital data are obtained which, after processing by an appropriate and known calculation means, are representative of the three-dimensional coordinates of the surface to be inspected. The surface is then materialized by a set of points in a three-dimensional space.

It is advisable to carry out the acquisition of the three-dimensional data of the surface to be inspected after having mounted the tire on a rim and after having inflated the tire to a reference pressure, so as to bring the tire close to its equilibrium curve, and to minimize the variations of positioning of the surface between two different tires. This also makes it possible to highlight anomalies of structure that can be detected by the method forming the subject of the present invention.

The exemplary embodiment of the invention described below more particularly addresses the inspection of the tire sidewalls which are usually filled with markings and graphic patterns of all types. However, the techniques used may, provided they are transposed, be used in an identical manner for the inspection of the inner portion or of the tread.

The surface serving as a reference may originate from the design data of the tire in three dimensions or, preferably, from the design and production data of the curing mould and more specifically from the data of hollowing out the shells used to mould the sidewalls and bearing the recessed markings. Specifically, the knowledge of the parameters for controlling the milling tool, supported by the knowledge of the mean radial profile of the shell, makes it possible to reconstruct a surface in relief assimilated to the reference surface.

The reference surface reconstructed in this manner takes the form of a set of points inscribed on the reference surface. It is also possible to associate with these points significant additional information on the nature of the surface on which they are situated, such as the indication that this point is situated on a smooth surface, a relief, a character or a set of alphanumeric characters, a particular pattern, such as a striated or smooth pattern. These indications are useful in the subsequent steps of applying the method, in particular when it is sought to determine said characteristic points.

As mentioned above, it is worthwhile to simplify the calculations to be made by carrying out a number of simplification steps first. One of the ways of achieving this consists in appropriately choosing the reference marks in which the three-dimensional coordinates of the points of the reference surface and of the surface to be inspected will be expressed, so as to allow simple projections making it possible to reduce the number of coordinates, and the number of dimensions of the space to be studied.

Therefore, we make sure that the coordinates in three dimensions x, y, z of the surfaces to be analysed are expressed in an orthonormal coordinate system OX, OY, OZ in which the axis OZ is substantially indistinguishable from the axis of rotation of the tire. It is then easy to convert the coordinates x, y, z by projection in the plane OXY and to change the Cartesian coordinates x, y in the plane OXY into polar coordinates of the $\rho$, $\theta$ type.

A first simplification consists in opening out the surface as illustrated in FIG. 1. For this it is sufficient to consider that the value of $\rho$ corresponds to the value on an axis OY' and that the value $\theta$ corresponds to the coordinate on the axis OX'. The reference mark OX'Y' itself being an orthonormal coordinate system.

Figure 2:
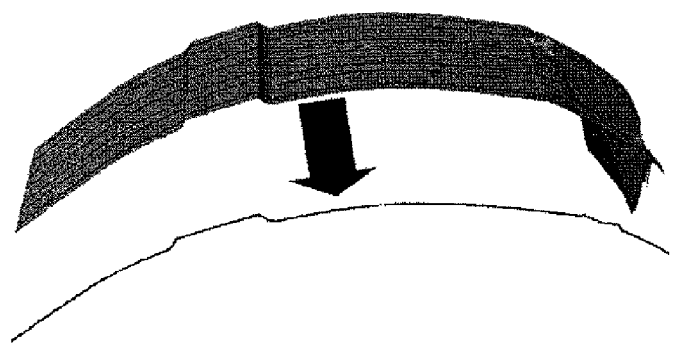
FIG. 2 represents an illustration of the determination of the mean radial profile of the surface.

A second simplification consists in determining the mean profile of the curve of the surface in a radial plane. To do this, it is sufficient to project all of the points into the plane formed by the axes OZ and OX', as illustrated in FIG. 2, which corresponds to a projection in a radial plane. The shape of the mean radial profile will be given by the shape of the cluster of points in this radial plane, from which it is possible to extract a mean curve by taking the mean of the values in a direction OZ. The surface obtained by again deploying this mean radial profile corresponds substantially to the surface of the tire on which no marking in relief appears.

It is then sufficient, for each value of the angle $\theta$, to subtract the value of this mean radial profile from the coordinates expressed in the plane OX'Z in order to obtain a flattening of the unrolled surface determined above, and in which only the elements in relief have a value on the axis OZ.

The flattening can also be carried out by following the profile of the surface according to a determined line, for example a line in which the value of $\rho$ is constant and by detecting the localized variations of the profile, significant of the markings in relief made on said surface. The juxtaposition of these lines also gives a flattened surface on which only the elements in relief appear.

In an equivalent manner, it is also possible to project the unrolled surface in the plane OXY.

Assigning a grey level value to the value on the axis OZ gives an image in two dimensions of the surface on which the elements in relief detach themselves visually relative to the colour of the mean surface.

The latter simplification can be carried out with a similar result on the flattened surface according to one of the methods explained above. FIG. 8 illustrates the result of these simplifications applied to the reference surface which has been unrolled, flattened and converted into a grey-level image. FIG. 9, for its part, represents the image unrolled and flattened of the surface to be inspected.

The search for the characteristic points is carried out by a conventional method of optical character recognition (OCR). According to this type of method, a first step consists in segmenting the surface in order to obtain a black-and-white image of the surface in one plane, making sure that said image has sufficient contrast so that the alphanumeric characters or the patterns are easily identifiable.

The simplest method for carrying out this segmentation, the steps of which are illustrated in FIGS. 3, 4 and 5, consists in using the unrolled and flattened surface according to the method explained above and in assigning a black or white colour to the elements in relief. Filtering makes it possible to eliminate the undesirable blemishes (FIG. 3). The alphanumeric characters or the patterns are then converted into lines or curves (FIG. 4) by a known method such as the method described by Ben K. Sang & Roland T. Chin in the article "One-Pass Parallel Thinning; Analysis, Properties and Quantitative Evaluation", PAMI Volume 14, No. 11, dated November 1992, so as to retain only the skeleton of the character or the pattern.

Once this operation is completed, it is then possible to apply one of the known optical character recognition methods for the purpose of identifying and locating the alphanumeric characters and the associated texts that are on the surface.

In order to simplify the application of the method and to increase the speed of carrying out the calculations, it is suggested to adjust the image of the reference surface relative to the image of the surface to be inspected. For this purpose, a collection of alphanumeric characters or patterns that occur only once on the surface is predetermined, as illustrated in FIGS. 8 and 9. When these characters have been located in both images, the angular difference $\Delta\alpha$ between these two characters is evaluated and a change of coordinates on the axis OX' (representing the angular value $\theta$) is made by having the origin of the angular values pass through these characters. The adjustment of the azimuth allows a direct comparison of the points with the same coordinates in the plane OX'Y'.

The azimuth resetting can be followed by a resetting in the radial direction OY' (representing the value of $\rho$) so as to improve the search and location of the markings on the rest of the surface.

When most of the alphanumeric characters, texts and patterns have been located on the image of the reference surface and on the image of the surface to be inspected, the alphanumeric characters that are associated with texts and patterns present on both surfaces are matched up.

The robustness of this association step is improved by using the information originating from the step of adjusting the azimuth carried out previously, which make it possible to identify more precisely the areas of search for the words or the patterns to be associated. The size of the characters can also be used to reduce the errors of association.

Therefore, the word "RADIAL" situated close to the bead on the reference image is associated with the word "RADIAL" situated in the same region of the image to be inspected.

The points formed by the intersection of the branches of the lines of the skeleton or else the terminal points of said branches are then determined on each character or on each pattern. These points form characteristic points the location of which is precise as illustrated in FIG. 7. In a nonlimiting manner, it is also possible to choose as characteristic points the vertices of a quadrilateral enveloping the alphanumeric character or the pattern as illustrated in FIG. 6, or else a barycentre of the lines or of the relief in question, such as for example a centre of gravity. What is important is that the coordinates of these points are known precisely and can be located without risk of confusion on the surface to be inspected and on the reference surface.

The corresponding characteristic points of the image of the reference surface and of the surface to be inspected are then associated two-by-two in order to form pairs of matched characteristic points.

As an example, the characteristic point associated with the tip of the first A of "RADIAL" of the reference image is associated with the characteristic point of the first A of "RADIAL" of the image to be inspected. This pair of points forms a pair of matched characteristic points.

The number of matched characteristic points can vary from one dimension to another and can also change between two successive analyses of one and the same tire as a function of possible anomalies that may be found on the markings in relief, but also, because of the successive rejections that can be made at each of the steps of applying the optical character recognition method which generates its own anomalies when the recognition criteria are not all fulfilled.

Ideally, the pairs of characteristic points are distributed over the whole surface to be inspected. It is observed that these points are preferably situated in the area placed close to the bead, because of the large number of markings and texts situated in this portion of the tire. This preferred location may turn out to be awkward subsequently, and it will be necessary to envisage corrective means.

The method according to the invention provides an additional simplification, prior to the determination of the first transformation function, which consists in carrying out a translation and a rotation of the reference surface in a radial plane. It has been shown that, when the tire is inflated and/or the bead has been placed on the rim or on the system for rotating the casing, the equilibrium curve of the sidewall tilts relative to the shape of the sidewall imposed by the geometry of the mould.

Figure 10:
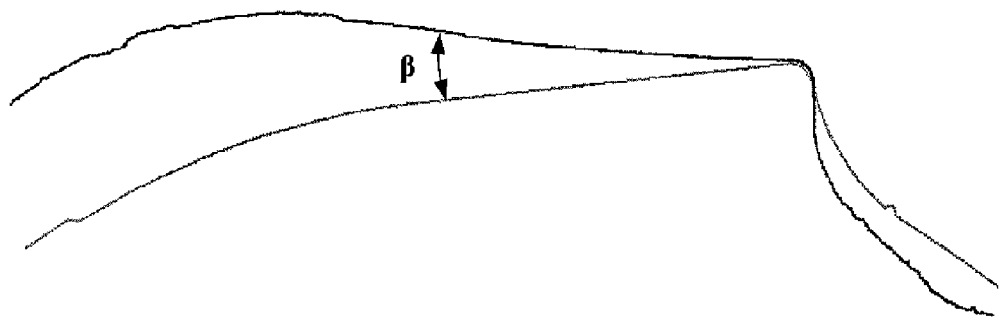
FIG. 10 illustrates the angular variation between the mean radial profile of the reference surface and the mean radial profile of the surface to be inspected.

This physical movement can be measured by comparing the mean radial profiles of the reference surface and of the surface to be inspected as illustrated in FIG. 10.

Figure 11:
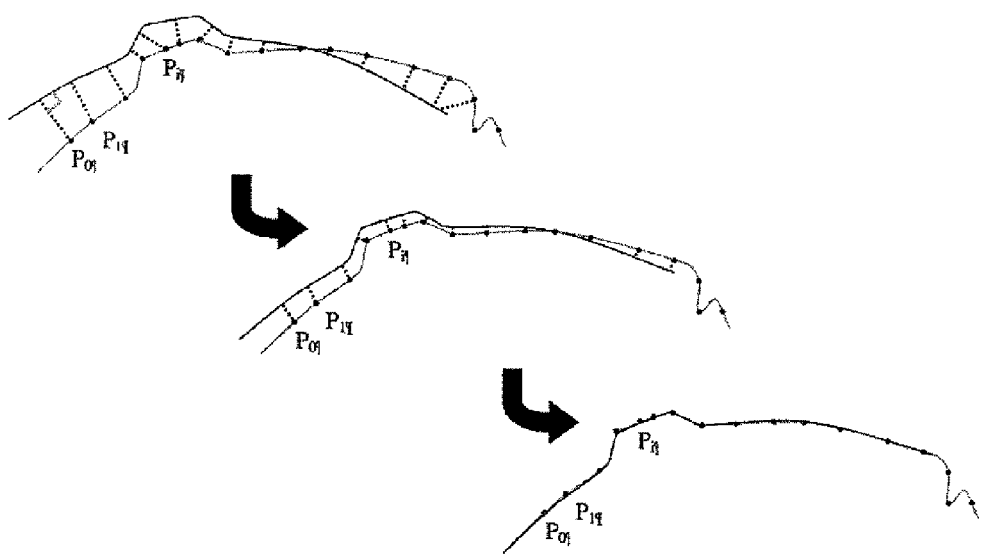
FIG. 11 illustrates the adjustment of the mean radial profile of the reference surface relative to the mean radial profile of the surface to be inspected.

The rotation and the translation are then sought that make it possible to have the curves of the two mean radial profiles coincide without deforming them. As an example, an algorithm of the ICP (Iterative Closest Point) type makes it possible to determine the rotation and the translation to be made which minimize the orthogonal distance (in the sense of least squares) between points of the mean radial profile of the reference surface and their orthogonal projection on the mean radial profile of the surface to be inspected as illustrated in FIG. 11. The points chosen to carry out these calculations will be usefully chosen from the characteristic points.

This rotation and this translation are then applied in the radial plane to all of the points of the reference surface.

The next step consists in finding the first transformation function. The set of the starting points to which this first transformation function will be applied is made up of the characteristic points of the reference surface and the ending set represents the set of transformed points, to each of which it is possible to link a magnitude representative of the distance separating it from the point of the surface to be inspected with which it is matched.

Then, by successive iterations, a first transformation function is sought that minimizes the total of these magnitudes.

This first transformation function could be a nonlinear function. In this case, it is observed that the determination of said function involves first choosing the general structure of the equations used.

However, the determination of the parameters involves a large number of pairs of characteristic points, and the calculation of these parameters may be complex. Although the result of this is a fairly good matching of the pairs of characteristic points, the choice of a nonlinear function is not very robust, because it is very sensitive to the variations of positioning of the characteristic points of the surface to be evaluated, and to the matching errors that may occur in the previous step. Moreover, this type of transformation allows deformations of all kinds the amplitudes of which it is difficult to limit.

Also, according to a preferred embodiment of the invention, the first transformation function is an affine function which consists of the combination of a rotation, a movement and a deformation or a homothetic transformation the ratio of which has an absolute value different from 1 in a given direction, and a scaling on each of the axes of coordinates. The centre of the homothetic transformation as a general rule consists of a point of the axis of rotation of the tire.

These affine functions have the value of conserving the geometric characteristics of the surfaces such as the parallelism, the middle, the distance ratios and the barycentres. The result of this is that the determination of the parameters is easier to achieve and requires less calculation time.

Moreover, the search for the first affine transformation function is greatly simplified when it is done on the images of the reference surface and of the surface to be inspected in two dimensions. This is the object of the simplification steps explained above during which each of the surfaces is successively unrolled, flattened out, in which the value of the relief has been transformed into a grey level or colour level and to which are applied the rotation and the translation in the radial plane.

The image or object coordinates (x', y', 1) of a point (x, y, 1) of the reference image thus simplified are obtained on the basis of the transformation which is expressed in the following vectorial form:

$$x' = H_{\text{Affine}} x$$

$$\begin{pmatrix} x' \\ y' \\ 1 \end{pmatrix} = \begin{bmatrix} a_{11} & a_{12} & t_x \\ a_{21} & a_{22} & t_y \\ 0 & 0 & 1 \end{bmatrix} \begin{pmatrix} x \\ y \\ 1 \end{pmatrix}$$

and can be rewritten in the following form:

$$p' = H_A p = \begin{bmatrix} A & t \\ 0^T & 1 \end{bmatrix} p$$

where t represents a translation in the plane and A a 2×2 affine matrix which can be written in the form of a rotation in the plane, and of a stretching out, or deformation, that is nonisotropic, on two perpendicular axes forming a given angle relative to the axes of the rectangular coordinate system.

As a first approach, it is however observed that the search for this first transformation function applied to the whole of the surface remains pertinent in that the deformations found take place essentially in the radial direction and are relatively homogenous over the whole circumference of the tire. Thus the effects of any local deformations due to anomalies remain minor.

As has been mentioned above, the search for the parameters describing the first transformation function is very sensitive to matching errors. Therefore a search algorithm will be used that allows each of the optimization loops to conserve the "pertinent" data and to eliminate the data judged to be "aberrant". As an example, the algorithm of the least median of the squares such as the Lmeds function described by Peter J. Rousseewn & Annick M. Leroy in the article "Robust regression and outliers detection", John Wiley and Sons, Inc ISBN 0-471-85233-3, New York, 1987, gives good results. This algorithm consists in taking random samples from the pairs of matched characteristic points and in estimating the transformation of these points. The points obtained are then classified according to the pertinence criteria chosen after a statistical analysis on the residual errors. This method makes it possible to determine the parameters of the first transformation function when the data contain up to 50% of data judged aberrant.

Figure 12:
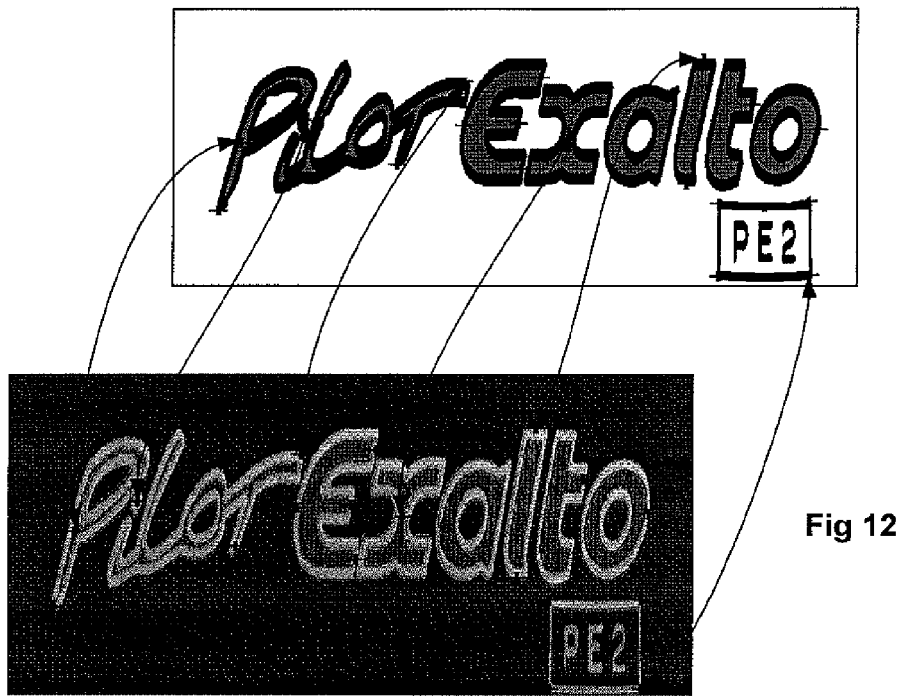
FIG. 12 illustrates the matching of characteristic points between the reference surface and the surface to be inspected.

Because of the simplifications proposed in the above steps, the number of parameters necessary to describe the first affine transformation function is small, and the number of pairs of matched characteristic points necessary to estimate linearly these parameters can be reduced to a minimum of six, as illustrated in FIG. 12.

It is observed, at this stage in the embodiment of the method according to the invention, that the search for this first transformation function can be carried out independently of the simplifications and of the changes of reference marks described above. It is also observed that the flattening, rotation and translation steps are themselves affine transformations which, by being combined with a first affine transformation, also give an affine transformation.

Once the first transformation function has been determined, this function is applied to the set of points of the reference surface. This makes it possible to obtain a reference surface that is transformed and adjusted relative to the surface to be inspected and of which all the points, whether they belong to a smooth surface element or to an element in relief, are adjusted.

Here it is decided to transform the reference surface and not the surface to be inspected. As will be seen below, this deliberate choice makes it possible to provide an additional analysis means in the search for anomalies that might be found on the surface to be inspected.

Figure 13:
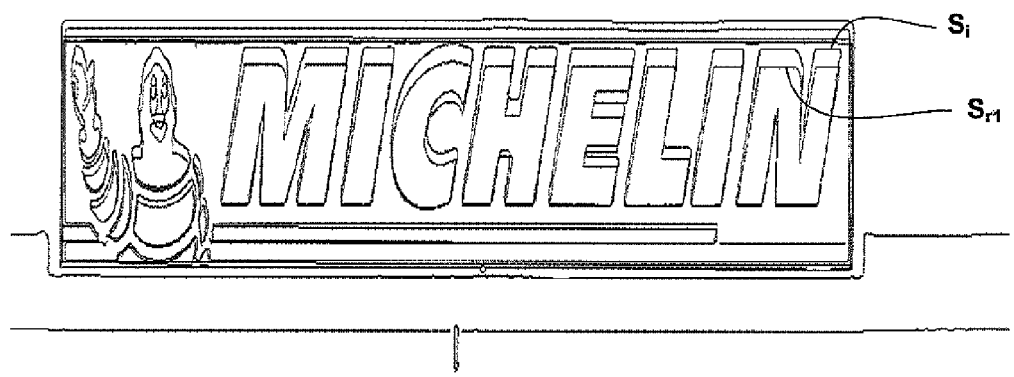
FIG. 13 illustrates the adjustment of the image of the reference surface relative to the image of the surface to be inspected, after application of the first transformation function.

FIG. 13 illustrates the superposition of the image of the surface to be inspected $S_i$ and of the image of the reference surface transformed with the aid of the first transformation function $S_{r1}$. It will be noted that the adjustment is very precise in the area placed close to the bead, in which the two images are superposed almost perfectly. On the other hand, the resetting of the portions of the sidewall, situated close to the shoulder of the tire, is less precise. This is largely due to the smaller number of characteristic points in this zone as has been mentioned above.

A first enhancement of the invention therefore consists in correcting, if necessary, these residual errors by carrying out a second adjustment step during which second transformation functions will be sought, the local application of which will have the effect of locally adjusting the reference surface.

A first method consists quite simply in forming subsets of matched characteristic points belonging to one and the same zone or portion of the reference surface and of the surface to be inspected. These subsets must comprise a minimum of six pairs of matched characteristic points.

Then, for each of the zones or portions of surface considered, and according to the same methodology as that which has been used to determine the first transformation function, second affine transformation functions are sought comprising a homothetic transformation of which the absolute value of the ratio is different from 1.

Each of the second transformation functions, in the same manner as was explained above, minimizes, in the zone considered, the value representing the sum of the distances between each of the reference-surface characteristic points transformed successively with the aid of the first and of the second transformation function and the points of the surface to be inspected that are matched therewith.

Here again, it is important to define surface portions that are sufficiently homogeneous and of which the surface area is adapted so as to reduce the effects of the anomalies of the surface to be inspected. In practice, the reference surface will be divided into portions or into zones comprising one or more characters or distinctive design previously identified.

As an illustration, the division into zones can be carried out by dividing the surface into angular sectors (between four and twelve) and into radial sectors (between two and three) so long as the number of matched characteristic points inside each zone is greater than six. This gives as many second transformation functions as there are zones.

Then this second affine transformation is applied to the set of points of said zone after the first transformation function has been applied thereto. Alternatively, the first and the second transformation are combined and this new transformation is applied to the zone in question.

The process described above can clearly be repeated in an iterative manner on increasingly small zones so long as they contain a minimum number of matched characteristic points. In these conditions, a first transformation function applicable to the set of points of the surface is combined with a second transformation function applicable to the set of points of a given zone, with a third transformation function established for a subzone of the zone in question like systems that are nested into one another.

It will then be observed that, by choosing surface portions the surface area of which is increasingly small, it becomes difficult to minimize the effects of the surface anomalies of the surface to be inspected. The transformation function will then tend to deform the portion of reference surface so as to adapt it to the anomalies of the surface to be inspected. That is why, in practice, the number of divisions into zones or surface portions is limited to two which amounts to calculating first and second and at most third levels of affine transformations by making the appropriate divisions.

A fine division does not make it possible to avoid the pitfalls indicated above and associated with the use of homothetic transformations. This drawback may however be turned into an advantage in that it is then possible to calculate a value or a norm representing the mean deformation of the portion of reference surface relative to the original reference surface. The difference of this value compared with a mean value established by calculating the mean of the deformations of the reference surface makes it possible to detect the zones or surface portions potentially having an anomaly on the surface to be inspected.

This method has a value in that it is possible to choose the zones on which it is worthwhile to look for a second transformation function, and even in exceptional cases, a third transformation function, in particular the zones situated in the radially outer portions of the sidewall which will be distinguished from the zones in which this search is not necessary, as is the case with the zones close to the bead of the tire, and where the application of only the first transformation function is sufficient.

A second method consists in preferably taking interest in the contours of the elements in relief situated on the reference image and on the image to be inspected. These contours are obtained from three-dimensional data using, for example, the images of the surfaces that are unrolled and flattened out of the reference surface transformed with the aid of the first transformation function and of the surface to be inspected. Specifically, this second method is applied efficiently only to the two-dimensional data of the image of the reference surface and of the surface to be inspected.

Elementary surfaces are then determined that will contain one or more portions of the contour of one or more objects in relief, and of which the contour has a variation in the level of grey or of colour, such as a single alphanumeric character, or a portion of a pattern and a portion of alphanumeric character, several alphanumeric characters, or else a particular decorative pattern.

Likewise, it may be worthwhile, as has been mentioned above, to limit oneself to only the elementary surfaces situated in the shoulder zone of the sidewall.

Inside each of the elementary surfaces, the sum of the distances is calculated between the points belonging to the contour of the image of the reference surface, transformed with the aid of the first transformation function and included in said elementary surface, and the closest points of the contour of the image of the surface to be inspected.

A second transformation function, applied to said points of said contour of the reference surface and included in said elementary surface, is sought in an iterative manner such that the value representing said sum of the distances is minimal.

An alternative determines this second local affine transformation function with the aid of the method called distance maps, as described by H. G. Barrow, J. M. Tenenbaum, R. C. Baum & H. C. Wolf in the article "Parametric correspondence and chamfer matching; two techniques for image matching" in Proc. Int. Joint Conf. Artificial Intelligence 977, p. 659-663. The value of this optimization algorithm lies in its simplicity.

It is also possible to increase the robustness of the method by using distance maps pointing in given directions. The distance taken into account then corresponds to the distance from the point to the closest contour in a given direction corresponding substantially to the direction of the segment on which this point is situated, and as described by Clark F. Olson & Daniel P Huttenlocher in the article "Target Recognition by Matching Oriented Edge Pixels" IEEE, Transactions on Image Processing, Vol. 6, No. 1 Jan. 1997. This trick makes it possible to safeguard the results obtained by "filtering" not very pertinent contours for the localized adjustment, such as the striations present inside certain patterns in relief.

When the parameters of the second local transformation function have been determined, this second transformation function is applied to the set of points of said elementary surface portion of the reference surface transformed with the aid of the first transformation function.

This therefore gives as many second transformation functions as there are elementary surface portions. Each of the points of the reference surface is therefore transformed once with the aid of the first transformation function, and a second time with the aid of the second transformation function corresponding to the elementary surface to which it belongs.

Figure 14:
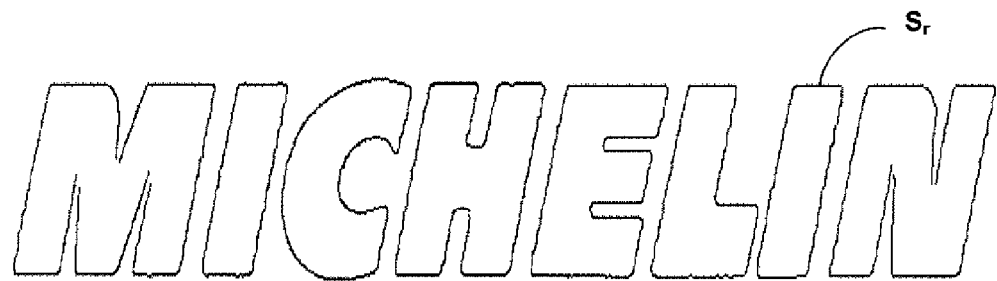
FIGS. 14, 15 and 16 illustrate the adjustment of the image of the reference surface relative to the image of the surface to be inspected, after application of the first and of the second transformation function.
Figure 15:
Figure 16:

FIG. 14 represents a view of the contours of the reference surface $S_r$. FIG. 15 represents a view of the image of the contours of the reference surface transformed with the aid of the first transformation function $S_{r1}$, superposed on the view of the contours of the image $S_i$ of the surface to be inspected. Finally, FIG. 16 illustrates the superposition of the contours of the image of the reference surface transformed successively with the aid of the first transformation function and of the second transformation functions, $S_{r2}$, with the image $S_i$, of the contours of the surface to be inspected. FIGS. 14, 15 and 16 have been expanded for explanatory reasons in order to highlight the differences.

The value of using two series of transformation functions, the first being applied to the whole of the reference surface and the second ones being applied in a particular direction or in a localized manner to elementary surfaces, lies in the fact that, when the first affine function has been determined, it can be applied to all tires of the same dimension, and only the second localized transformation functions must be recalculated for each of the tires to be inspected. The advantage of this is that it limits the calculation time and simplifies the inspection operations.

Another enhancement of the method relates to matching the reference model with the real reliefs of the mould used to carry out the curing operation. As has been mentioned in the preceding paragraphs, the data making it possible to describe the surface used as a reference preferably originate from the data for producing the curing mould. Frequently the real mould used to cure the tire is the subject of minor modifications during its use. This is the case for example when vents are pierced to make it easier to discharge the gases, or else when the removable plates bearing the information on the date when curing takes place are changed.

To carry out this correspondence, it is proposed to use a tire considered to be a reference tire and to determine the three-dimensional profile of its surface. Then, by superposition, the reference surface transformed according to the steps described above is compared with the surface of the reference tire. The differences between these two surfaces are shown to a qualified operator who identifies these changes.

When the operator finds that a difference is not the result of a manufacturing anomaly, he can then replace the corresponding portion of reference surface with data originating from the surface portion of the reference tire and comprising the change in relief marking in question. The reference surface is thus modified and enhanced with the changes made on the manufacturing mould. This enhanced reference is then used as a new reference for the inspection of the subsequent tires.

Assessing the conformity of the surface to be inspected compared with the reference is not explicitly the subject of the present invention, but it will be observed that the preparatory step which consists in applying the adjustment method as described in the preceding paragraphs makes it possible to render more pertinent the analysis of the differences between the surface to be inspected and the reference surface. In particular, it results in a considerable reduction in the number of incorrect detections, and a better appreciation of the manufacturing anomalies in the portions of the surface that do not contain reliefs.

The method disclosed by the present description applies particularly well to the zones of the tire that are situated in the sidewalls which comprise many markings in relief formed of easily identifiable alphanumeric characters.

The application of the method for analysing the conformity of the inner surface of the tire consequently requires a few adaptations. In particular, the search for the characteristic points can no longer be based on the search for alphanumeric characters and the use of a search method of the OCR type. The user then makes sure to identify particular patterns that can if necessary be created for this purpose.

It is also altogether possible to envisage the use of a method according to the invention for the inspection of the tread. It is nevertheless observed that the movements due to mounting and inflation are of very slight amplitude in this portion of the tire. The result of this is that the requirements for adjusting the surfaces are of smaller amplitude and that consequently the calculation algorithms can be greatly simplified and be limited simply to searching for the first transformation function.

The invention claimed is:
1. A machine implemented method for inspecting a portion of the surface of a tire comprising markings in relief, the method comprising:
   determining a three-dimensional profile of the surface to be inspected;

locating characteristic points on the surface to be inspected, by a processing device;

matching the located characteristic points with corresponding characteristic points from three-dimensional data of a reference surface, to create a set of pairs of matched characteristic points, by the processing device;

determining in an iterative manner by the processing device, a first transformation function that minimizes a value representing a sum of the distances between each of the characteristic points of the reference surface, when the characteristic points of the reference surface are transformed by the first transformation function, and the respective matching characteristic points of the surface to be inspected; and applying the first transformation function to all of the points of the reference surface to transform the reference surface, by the processing device, wherein the transformation function is an affine function comprising a homothetic transformation having a ratio with an absolute value different from 1.

2. The inspection method according to claim 1, wherein the location of the characteristic points is determined by optical recognition of the alphanumeric characters and of the texts or of the patterns in relief present on the surface to be inspected, by:

segmenting the surface to obtain a black-and-white image of the surface in a plane;

associating each alphanumeric character or pattern with a linear mark having branches representing a skeleton of the alphanumeric character or of the pattern;

calculating, for each alphanumeric character or for each pattern, one or more numeric values characteristic of a geometry of the character or pattern;

associating an alphanumeric character or a series of alphanumeric characters of the image of the surface to be inspected with a character or with a text of the image of the reference surface, or associating a pattern of the image of the surface to be inspected with a pattern of the reference image; and choosing one or more points of each of the located and associated alphanumeric characters or of the patterns as a characteristic point.

3. The inspection method according to claim 2, wherein the characteristic points of an alphanumeric character or of a pattern are chosen from the intersection of the branches of the linear mark associated with the skeleton of the characters or of the patterns, the terminal points of the branches, the corners of a quadrilateral enveloping the skeleton of the alphanumeric character or of the pattern, or a barycenter of the points forming the lines of the alphanumeric character.

4. The inspection method according to claim 1, wherein determining the first transformation function is preceded by:

determining the mean radial profile of the reference surface and the mean radial profile of the surface to be inspected;

determining the rotation and the translation to be applied in a radial plane to the mean radial profile of the reference surface to cause the two profiles to coincide; and applying the rotation and the translation to all of the points of the reference surface.

5. The inspection method according to claim 1, wherein three-dimensional coordinates (x, y, z) of the data describing the reference surface and the surface to be inspected are expressed on three orthonormal axes OX, OY and OZ, and the axis OZ corresponds substantially to the axis of rotation of the tire.

6. The inspection method according to claim 5, wherein the values (x, y) in the plane OXY are converted into polar coordinates ($\rho$, $\theta$).

7. The inspection method according to claim 6, wherein selecting the first transformation function is preceded by:

identifying in the matched points, the characteristic point or points situated on markings in relief and appearing only once on the portion of surface to be inspected; and adjusting the image of the reference surface and the image of the surface to be inspected by placing an origin of the angular values ($\theta$) and an origin of the radial values ($\rho$) of the image of the reference surface and of the image of the surface to be inspected at the angular value and at the radial value of the characteristic points.

8. The inspection method according to claim 7, further comprising, after applying the first transformation function to all of the points of the reference surface:

determining the contours of the image of the reference surface and of the image of the surface to be inspected;

dividing the image of the reference surface into elementary surfaces;

calculating, inside each of the elementary surfaces, the sum of the distances between the points of the contour of the image of the reference surface and the points of the closest contour of the image of the surface to be inspected;

determining in an iterative manner a second affine transformation function comprising a homothetic transformation with a ratio having an absolute value different from 1, that when applied to the selected points of the contour of the reference surface, transformed by the first transformation function and belonging to the elementary surface, minimizes a value representing the sum of the distances; and applying the second transformation function to all of the points of the elementary surface of the reference surface to further transform the elementary surface.

9. The inspection method according to claim 1, further comprising, after applying the first transformation function to all of the points of the reference surface:

forming subsets of matched characteristic points belonging to corresponding zones of the reference surface and of the surface to be inspected;

determining in an iterative manner, a second affine transformation function comprising a homothetic transformation with a ratio having an absolute value different from 1, that when applied to the characteristic points of a respective zone transformed by the first transformation function, minimizes a value representing a sum of the distances between each of the characteristic points of the respective zone of the reference surface, transformed by the first transformation function and by the second transformation function, and the matched points of the surface being inspected; and applying the second transformation function to all of the points of the reference surface to further transform the reference surface.

10. The inspection method according to claim 9, further comprising assessing conformity of the zone to be inspected by comparing transformed digital data describing the surface to be inspected with transformed digital data describing the reference surface.

11. The inspection method according to claim 1, wherein the three-dimensional data of the reference surface originate from the data for production of the mold for the curing of the tires to be inspected.

12. The inspection method according to claim 1, further comprising:
inflating the tire to be inspected to a reference pressure before determining the three-dimensional profile of the surface to be inspected.

13. A device for inspecting the surface of a tire comprising:
means for determining the three-dimensional profile of the surface to be inspected;
means for storing the digital data describing the reference surface; and
computerized calculation means for applying calculation algorithms to:
determine the three-dimensional profile of the surface to be inspected;
locate characteristic points on the surface to be inspected;
match the located characteristic points with the corresponding points originating from the three-dimensional data of a reference surface to create a set of pairs of matched points;
determine, in an iterative manner, a first affine transformation function comprising a homothetic transformation with a ratio having an absolute value different from 1, that when applied to the characteristic points of the reference surface, minimizes a value representing a sum of the distances between each of the characteristic points of the reference surface, when the characteristic points of the reference surface are transformed by the first transformation function, and the respective matching points of the surface to be inspected; and
apply the first transformation function to all of the points of the reference surface in order to obtain a transformed reference surface.

\* \* \* \* \*